July 8, 1952 B. MALY 2,602,275
AUTOMATIC FEEDING MACHINE
Filed March 10, 1951 2 SHEETS—SHEET 1
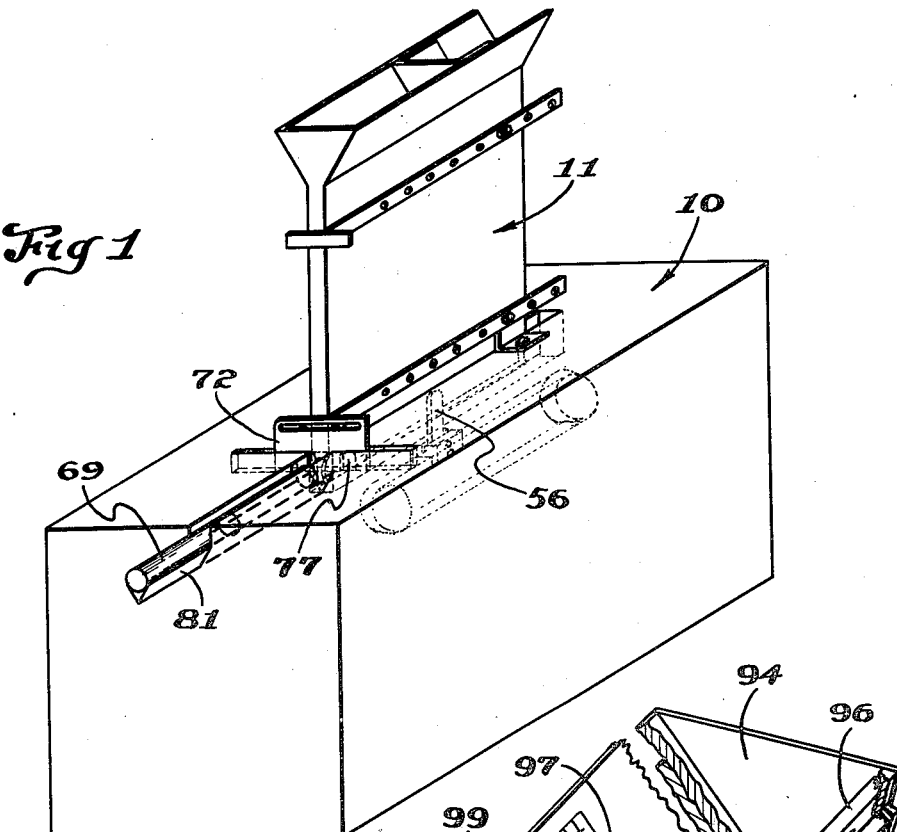
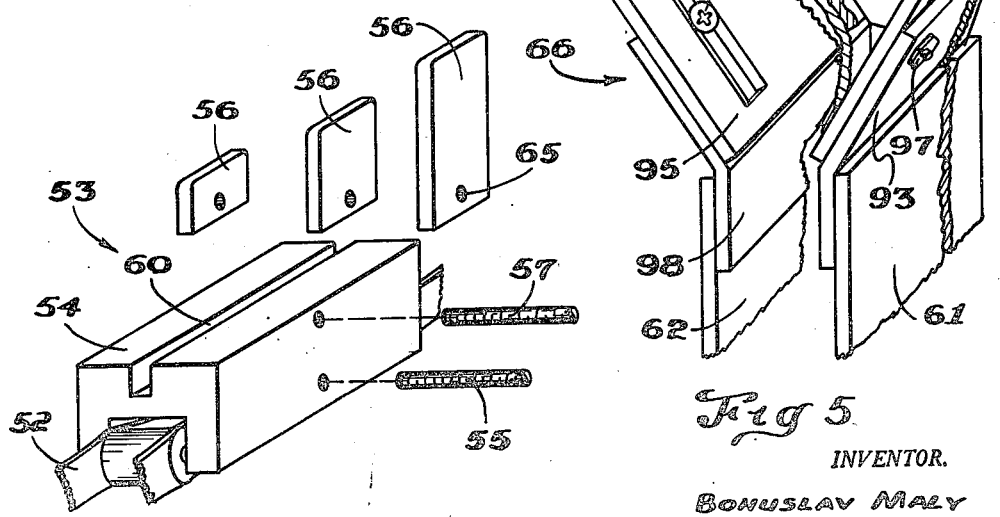
INVENTOR.
BONUSLAV MALY
BY Marvin Moody
ATTORNEY July 8, 1952 B. MALY 2,602,275
AUTOMATIC FEEDING MACHINE
Filed March 10, 1951 2 SHEETS—SHEET 2

INVENTOR.
BOHUSLAV MALY
BY Marvin Moody
ATTORNEY

Patented July 8, 1952

2,602,275

UNITED STATES PATENT OFFICE 2,602,275

AUTOMATIC FEEDING MACHINE

Bohuslav Maly, Marion, Iowa

Application March 10, 1951, Serial No. 214,957

7 Claims. (Cl. 51—215)

This invention relates in general to automatic machinery and in particular to an automatic feeding machine which is adapted to eject billets from a hopper at a predetermined rate.

It is oftentimes desirable in machine operations to perform the same operation upon a large number of parts.

For example, in grinding rods to a predetermined diameter it may be desirable to pass them through a centerless grinder which grinds them to a preset diameter. Oftentimes a great number of parts must be passed through a machine one after the other.

It is an object of this invention, therefore, to provide an automatic feeding machine which will feed a plurality of pieces from a hopper at a predetermined rate.

Another object of this invention is to provide a feeding machine which will replace a group of men.

Yet another object of this invention is to provide an automatic feeding machine which may be used for feeding billets into a centerless grinder, for example.

Still another object of this invention is to provide an automatic improved feeding machine which may be adjusted to feed different sizes of billets from a hopper and which may be regulated to control the rate of the billet output.

A feature of this invention is found in the provision for a driving means coupled to an endless belt through a variable speed transmission and wherein the endless belt is formed with a plurality of spaced projections adapted to engage billets within a hopper to feed them out of the machine at a predetermined rate.

Further objects, features, and advantages of this invention will become apparent from the following description and claims when read in view of the drawings, in which:

Figure 1 illustrates the automatic feeding machine of this invention;

Figure 4 is a detail view of the projections illustrating how they are mounted to the endless belt; and, Figure 5 is a detail view of the hopper of this invention.

Figure 2:
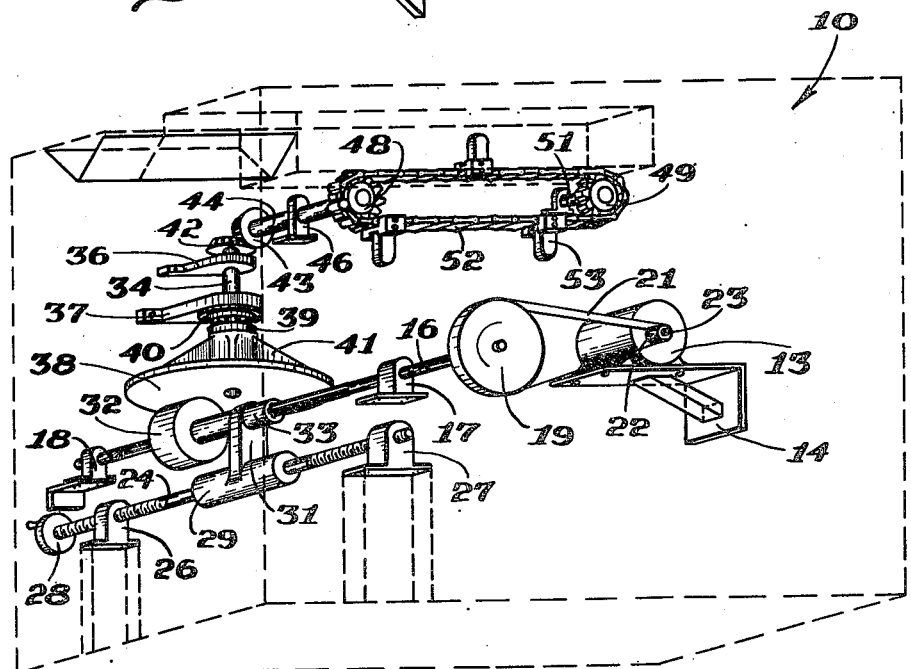
Figure 2 is an enlarged detail view of the driving means, power transmission and endless belt of this invention.

Referring to Figure 1 a cover member 10 is generally rectangular in shape and has mounted to the top thereof an upwardly extending hopper 11. As is best shown in Figure 2 the cover member 10 has mounted therein a driving means 13 which is supported by bolts or other fastening means to an L-shaped bracket 14 which is in turn connected by bolts or other fastening means to an end wall of the cover member 10. A shaft 16 is rotatably supported by brackets 17 and 18 at either end thereof which are in turn fastened to the cover member 10. A pulley 19 is rigidly connected to one end of the shaft 16 and flexible means 21 connect the pulley 19 with a pulley 22 mounted on the output shaft 23 of the motor 13.

A shaft 24 is rotably supported adjacent its ends by brackets 26 and 27 which are in turn connected to the cover member 10 and one end of shaft 24 has mounted thereon a hand wheel 28 which is mounted externally of the cover member 10. The portion of the shaft 24 between the brackets 26 and 27 is threaded and a threaded collar 29 is received thereon. An upwardly extending portion 31 is attached to the collar 29 and its upper end is formed with a loose opening through which the shaft 16 extends. A friction wheel 32 is rigidly mounted on the shaft 16 by means of splines formed on the shaft 16.

The friction wheel 32 has an outwardly extending collar 33 which is formed with a depression intermediate its ends and receives therein the upwardly extending projection 31. Thus, the position of collar 29 controls the position of friction wheel 32.

A shaft 34 is rotatably mounted in brackets 36 and 37 at right angles to shaft 16 and has slidably but not rotatably attached to the lower end thereof a friction wheel 38 that engages the friction wheel 32. A spring 39 is mounted between a collar 40 which is rigidly connected to the shaft 34 and an upwardly extending collar 41 on wheel 38.

The upper end of the shaft 34 has mounted thereon a beveled gear 42 which meshes with a beveled gear 43 mounted on a shaft 44 which is rotatably supported in the bracket 46 that is mounted to the cover member 10.

A gear wheel 48 is supported on the end of shaft 44 and a second gear wheel 49 is rotatably supported on a shaft 51 which is in turn supported by the cover member 10. An endless belt 52 passes over the gear wheels 48 and 49 and a plurality of projections 53 are mounted to the belt 52.

As best shown in detail in Figure 4 the projection assembly 53 comprises a generally rectangular member 54 which has threaded pins 55 fitting into either side thereof adapted to be rigidly connected to the belt 52. The pins 55 engage a pivot point of belt 52. The upwardly extending projections 56 are received in a longitudinal slot 60 formed in the member 54 and a set screw 57 passes through a transverse opening formed in the member 54, to pass through an opening 65 formed in the lower end of projection 56.

Projections 56 of various lengths may be placed in the slot 60 for engaging billets of various diameter.

Figure 3:
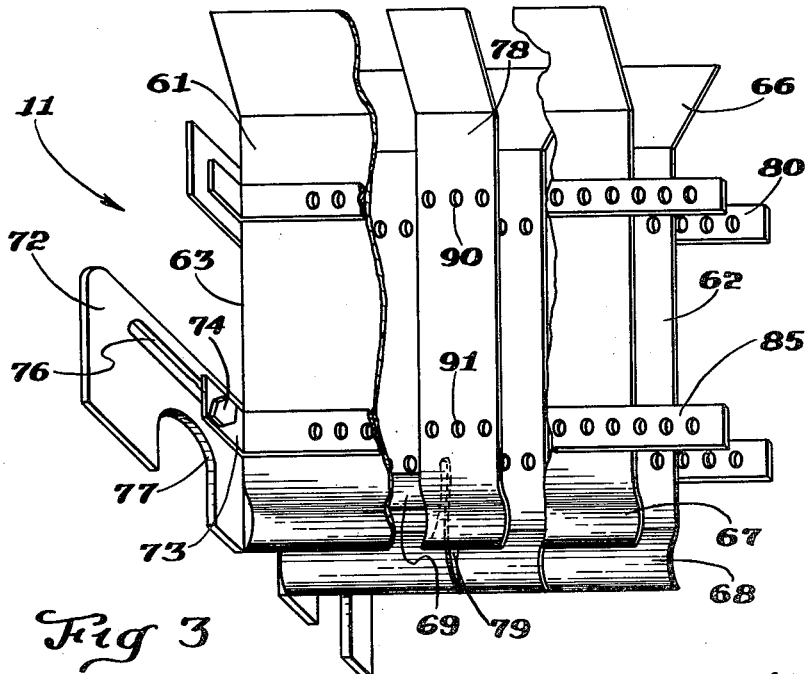
Figure 3 is an enlarged cutaway isometric view of the hopper of this invention.

As best shown in Figure 3 the hopper 11 comprises the side walls 61 and 62 and the end wall 63. The upper ends of the hopper flare outwardly to form a receiving portion 66. The lower end of the hopper is formed with generally inwardly curved arcuate portions 67 and 68 which are adapted to engage billets 69 received in the hopper.

The front wall 63 of the hopper is open adjacent the bottom and a template 72 is mounted thereon by holding brackets 73 which have bolts 74 extending through a slot 76 formed in the template 72. The lower edge of the template 72 is formed with two or more arcuate openings 77 of different sizes to facilitate different sized billets being handled by the machine.

As shown by the cutaway portion of the hopper a slidable member 78 is received within the hopper and may be moved transversly of the hopper to facilitate billets of different lengths. The lower end of the member 78 is formed with a slot 79 to allow the projections 56 to pass therethrough. The member 78 has the same general shape as the hopper.

As shown in Figure 1 the hopper 11 fits down over the belt 52 so that the projections 56 may engage billets within the hopper 11. A generally V-shaped receiver 81 is mounted to the cover member 10 adjacent the lower end of the hopper 11 to receive the billets fed from the hopper by the belt 52.

Figure 5 illustrates a modification of the upper end of hopper 11 to allow various diameters of billets to be received within the hopper. The spacing between side walls 61 and 62 must be varied at times to better facilitate varying diameter billets. For this purpose applicant has found it convenient to change the entire hopper including the member 78 with the exception of the receiving portion 66. The apparatus of Figure 5 makes it possible to retain the receiving portion 66.

The receiving portion 66 comprises a truncated V-shaped member having sidewalls 95 and 96 and an end wall 94. The sidewalls 95 and 96 are formed with tapered slots 99 at either end thereof for receiving bolts 97 therein. A pair of angle plates 93 and 98 are formed with openings to receive the bolts 97 therein and are slidably connected to the sidewalls 95 and 96. Thus, means are provided for mounting the plates 93 and 98 so as to vary the size of the space between them. The lower ends of plates 93 and 98 are received within the sidewalls 61 and 62 of the hopper and the billets placed in the receiving portion pass down into the hopper. Each time a hopper with a different spacing between walls 61 and 62 is mounted, the bolts 97 are loosened and the plates 93 and 98 adjusted to the new size before re-tightening the bolt 97.

In operation the hopper 11 is adjusted by setting the member 78 to the length of the billet to be handled. Upper transverse bars 80 are attached to the hopper and are formed with a plurality of openings and lower transverse bars 85 are mounted to the hopper and formed with a plurality of transverse openings. The member 78 is formed with upper transverse openings 90 which may be axially aligned with the openings formed in the member 80. Holding means, as for example, a bolt may be received through the openings to hold the member 78 in a predetermined position relative to the hopper. The lower portion of the member 78 is formed with openings 91 axially aligned with openings formed in the member 85 in order to receive suitable holding means therethrough.

The billets are inserted into the hopper and impinge on the inwardly curved portions 67 and 68 which prevent them from falling down into the machine. The template 72 is moved to select an opening 77 corresponding with the size of the billets being handled. The projections 56 are mounted on the members 54 with the proper length being selected so that the upper ends will engage the billets within the hopper. The hand wheel 28 is rotated to adjust the position of the friction wheel 32 relative to the friction wheel 38. This controls the speed of the rotation of the belt 52 and consequently the speed of feeding billets from the hopper.

The driving means 13 is energized and a billet 69 is engaged by a projection 56 and pushed through the opening 77 of the template 72 and upon the V-shaped member 81. When the next projection 56 passes through the hopper another billet will be pushed onto the receiving member 81 and the billet on the receiving member will be pushed into the machine being fed as for example a centerless grinder.

The rate of feed may be varied by the hand wheel 28 and the machine of this invention should be adjusted so that it feeds out billets only as fast as the receiving machine can handle them. Oftentimes the speed of the receiving machine may also be varied.

Although this invention has been described with respect to preferred embodiments thereof it is not to be so limited as changes and modifications may be made therein which are within the full intended scope of this invention as defined by the appended claims.

I claim:

1. An automatic feeding machine for feeding billets comprising, the combination of a cover member, a driving means mounted to said cover member, a first shaft rotatably supported by supporting brackets to said cover member and formed with a threaded portion between the supporting brackets and having a hand wheel at one end thereof, a threaded collar formed with an upwardly extending projection received on said first shaft, a second shaft rotatably supported on said cover member and having a friction wheel formed with an extending collar mounted thereon, a pulley mounted on the second shaft and flexible means connecting said pulley to the output shaft of said driving means, a second friction wheel slidably but non-rotatably supported on a third vertically mounted shaft above said first friction wheel so that they engage, a fourth shaft rotatably supported on said cover member and geared to said third shaft and having a first gear wheel mounted thereon, a fifth shaft rotatably supported in said cover member and having a second gear wheel mounted thereon, an endless belt mounted on said first and second gear wheels, a plurality of projections mounted on said endless belt, a hopper formed with lower inwardly curved portions received on said cover member above said gear wheels with said arcuate portions extending partially down over the projections on the upper portion of the belt, and V-shaped billet-receiving means mounted longitudinally of said cover member to receive billets as they are ejected by the projection from said hopper.

2. An automatic feeding machine for delivering billets at a predetermined rate comprising, a cover member which has mounted therein a driving means, a first gear wheel rotatably supported within said cover member, a second gear wheel rotatably supported in said cover member, a variable speed drive mounted in said cover member and receiving a shaft input from said driving means and supplying a shaft output to one of said gear wheels, an endless belt mounted over said first and second gear wheels, a plurality of projections mounted on said endless belt at intervals greater than the length of billets, a hopper mounted to said cover member and extending upwardly therefrom, said hopper formed with an upper billet receiving portion and a lower billet engaging arcuate portion, said arcuate portion extending down over the projections on the upper side of said endless belt, and a V-shaped billet-receiving means mounted longitudinally ahead of said endless belt to receive billets ejected from said hopper by said projection.

3. An apparatus according to claim 2 wherein said hopper is formed with a slot in its lower rear end wall for receiving therethrough said projections, the front end of the hopper formed with a lower opening, a rectangular shaped template mounted to the front end of said hopper by brackets and bolt and nut means receivable in a longitudinal slot formed in said template, and a plurality of different size arcuate openings formed in the lower edge of said template to be moved in front of the opening in the forward wall of said hopper.

4. An apparatus according to claim 2 wherein said hopper is formed with a slidable member received in said hopper and movable transversely thereof to vary the size of the hopper so that different size billets may be received therein, said slidable member having the same general shape as said hopper and formed with lower arcuate portions, and formed with a slot through its lower end wall to allow the projections to pass therethrough.

5. Apparatus according to claim 2 wherein said hopper has a generally rectangular template with arcuate openings along its lower edge, said template slidably mounted to the forward edge of said hopper so that it may be moved transversely thereof, a slidable member received in said hopper and having the same general shape thereof and movable longitudinally thereof to vary the size of the opening for said billets, a plurality of openings formed through said slidable member, bolt and nut means received through the opening in said hopper and said slidable member to fasten said slidable member to said hopper, the lower end of said slidable member formed with a slot for receiving a projection therethrough, and the forward end of said hopper formed with an opening for allowing the billets to pass therethrough.

6. Apparatus according to claim 2 wherein said projections are mounted to said endless belt by means of an assembly comprising, a generally rectangular member which has a lower longitudinal slot formed therein for receiving said endless belt therethrough, a first pair of threaded holding pins received transversely in said rectangular member to engage a pivot point of said endless belt at either side of said rectangular member, a second slot formed longitudinally of the upper side of said rectangular member, a projection received in said second slot, and a set screw received transversely through said rectangular member to engage the lower end of said projection.

7. An apparatus according to claim 2 wherein the width of said hopper may be adjusted by changing the lower side walls of said hopper for one of different size while maintaining the same receiving portion comprising, a truncated V-shaped member forming the upper end of said receiving portion, a pair of angle plates connectible to either side of said V-shaped member by bolt and nut means passing through the upper edges of said angle members and receivable in slots formed in said V-shaped member, and the lower ends of said angle plates receivable within the upper end of the side walls of said hopper.

BOHUSLAV MALY.

REFERENCES CITED

The following references are of record in the file of this patent:

UNITED STATES PATENTS

| Number | Name | Date |
|---|---|---|
| 160,686 | Kingman | Mar. 9, 1875 |
| 661,552 | Rich et al. | Nov. 13, 1900 |
| 1,288,125 | Muller | Dec. 17, 1918 |
| 2,241,351 | Indge et al. | May 6, 1941 |
| 2,503,760 | Murray et al. | Apr. 11, 1950 |